United States Patent
Lycan

[11] 3,869,801
[45] Mar. 11, 1975

[54] GAUGE FOR MEASURING THE DEGREE OF ALIGNMENT AT THE INNER SURFACES OF TWO TUBULAR MEMBERS POSITIONED END TO END

[76] Inventor: Goodwin A. Lycan, Lot 53, Mobile Villiage, Stevensville, Mich. 49127

[22] Filed: June 17, 1974

[21] Appl. No.: 480,125

[52] U.S. Cl.............................. 33/174 R, 33/143 M
[51] Int. Cl. .............................................. G01b 3/20
[58] Field of Search ........... 33/180 R, 181 R, 143 J, 33/143 M, 143 R, 143 K, 180 B, 174 K, 174 R, 169 D, 169 R, 84; 228/44

[56] References Cited
UNITED STATES PATENTS
2,293,411  8/1942  Spillman........................... 33/143 M
2,498,397  2/1950  Daly.............................. 33/143 M X Primary Examiner—Harry N. Haroian
Assistant Examiner—Michael Thaler
Attorney, Agent, or Firm—Oltsch & Knoblock

[57] ABSTRACT

An alignment determining gauge which includes a pair of parallel bar members having mutually contacting side faces. The bar members are shiftable longitudinally of one another and have corresponding juxtaposed end parts which are each formed into a laterally projecting contact. Tubular members which are to be measured by the gauge are positioned end to end in a spaced relationship. This permits the contacts of the gauge to be inserted between the ends of the tubular members and rotated with each contact engaging the inner surface of a tubular member upon longitudinal shiftable movement of the bar members. The offset of the inner surfaces of the tubular members which is indicative of the degree of alignment thereof is determined by the relative positions of the gauge contacts.

7 Claims, 4 Drawing Figures

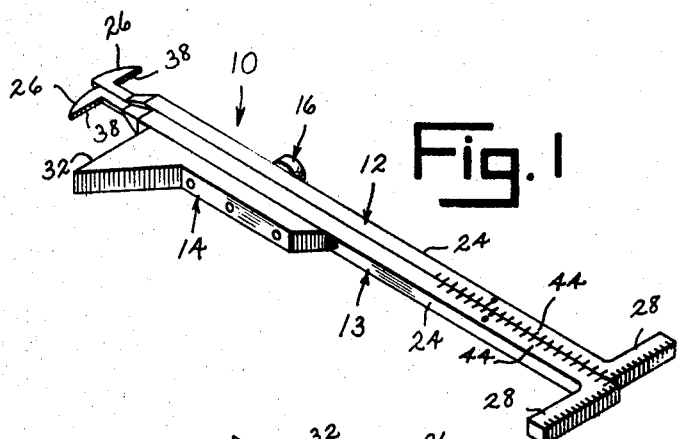
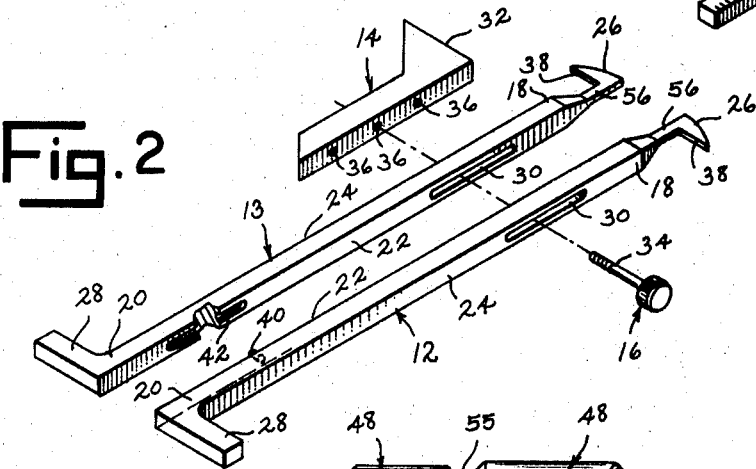
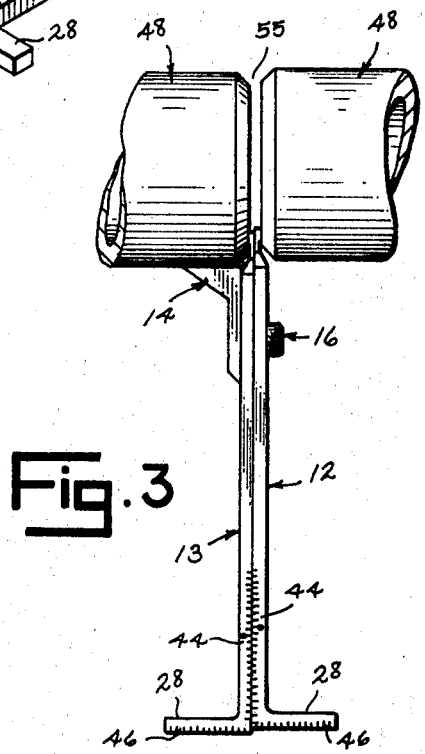
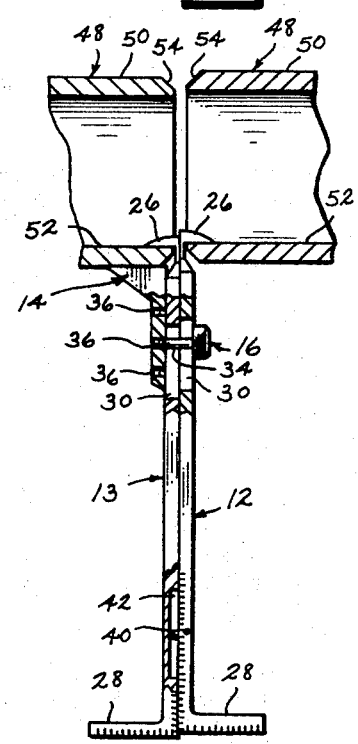

3,869,801

GAUGE FOR MEASURING THE DEGREE OF ALIGNMENT AT THE INNER SURFACES OF TWO TUBULAR MEMBERS POSITIONED END TO END

SUMMARY OF THE INVENTION

This invention relates to an improved hand held gauge utilized for measuring the degree of alignment of the inner surfaces of two tubular members positioned end to end.

The gauge of this invention includes parallel first and second bar members having mutually contacting side faces which extend longitudinally of the bar members. The bar members are shiftable lengthwise or longitudinally relative to each other and have corresponding juxtaposed end parts which are each defined by a laterally projecting contact. These contacts project oppositely of one another in the same plane and each includes an edge face disposed at a substantially right angle to the longitudinal dimension of its bar member. A shoulder part is carried by one of the bar members spaced from its end part. Means are provided for shifting the shoulder part along its carrying bar member toward and away from the contact edge face thereof.

The contacts of the bar members are inserted between the slightly spaced ends of two end to end positioned tubular members and turned to bring each contact edge face of the bar member into engagement with the inner surface of the tubular member. The shoulder part is then shifted into contact with one of the tubular members to cause the tubular member to be firmly contacted at its inner and outer surfaces by the contact edge face of one bar member and the shoulder part carried thereby. The location of one edge face relative to the other edge face of the respective bar members determines the degree of alignment of the inner surfaces of the tubular members. The gauge of this invention will have particular application in determining flow lines through pipes and similar tubular members and will serve to indicate when the pipes must be re-aligned to meet prescribed specifications prior to being welded or otherwise attached together.

Accordingly, it is an object of this invention to provide a manually operable, hand held gauge for measuring the degree of alignment at the inner surfaces of two tubular members positioned end to end.

Another object of this invention is to provide a multipurpose measuring gauge for use in determining the thickness, inner surface alignment and shoulder lengths of tubular members placed end to end.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the gauge.

FIG. 2 is a perspective view of the gauge showing the parts thereof in exploded form and with a portion of one gauge part broken away for purposes of illustration.

FIG. 3 is a view of the gauge being utilized to measure the degree of alignment of the inner diameters of two pipes positioned end to end.

FIG. 4 is a sectional view of the pipes of FIG. 3 showing the gauge in operative position and with portions of the gauge parts broken away for purposes of illustration.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Gauge 10 includes two bar members 12 and 13, a shoulder part 14 and a tightening screw 16. Each bar member 12 and 13 includes end parts 18 and 20 and oppositely positioned parallel inner side face 22 and outer side face 24 which extend between the end parts along the longitudinal dimension of the bar member. The end part 18 of each bar member 12 and 13 is formed into a contact 26 which projects laterally outwardly from the adjacent side face 24 of the bar member. The opposite end part 20 of each bar member 12 and 13 is formed into a right angular foot part 28 which also projects laterally outwardly from side face 24 of the bar member.

Each bar member 12 and 13 has an elongated slotted opening 30 formed therein which extends through the bar member from one side face 22 to the other side face 24 thereof. The bar members are placed side by side in mutual contact at side faces 22 with openings 30 therein in alignment. Shoulder part 14 is fitted against outer side face 24 of bar member 13 at opening 30 therein. The shoulder part includes a contact surface 32 which extends at a right angular relationship to side face 24 of bar member 13. Tightening screw 16 includes a threaded shank 34 which extends with clearance from side face 24 of bar member 12 through aligned openings 30 in the bar members and is turned into a selected threaded opening 36 in shoulder part 14.

Each contact 26 of bar members 12 and 13 includes an edge face 38 which extends at a right angle to side face 24 of the associated bar member. Contact edge face 38 of bar member 13 parallels contact surface 32 of shoulder part 14 with the shoulder part being shiftable longitudinally along the bar member in an oppositely spaced relationship from the contact edge face. Bar member 12 carries a pin 40 which projects outwardly from side face 22 thereof into a longitudinal slot 42 formed in confronting face 22 of bar member 13. Pin 40 and slot 42 form a guide which causes the bar members to remain in a parallel relationship as one bar member is slid longitudinally over the other.

A scale 44 is imprinted upon each bar member 12 and 13 along end parts 20 thereof adjacent the edges of confronting inner side faces 22. Scales 44 are precisely aligned when contact edge faces 38 of the bar members are precisely aligned and lie within the same plane. Any offset of edge faces 38 as illustrated in FIG. 1 will cause the misalignment of scales 44 which indicates to the user of gauge 10 the amount of such offset. Additionally, a separate set of scales 46 extend along each foot part 28 of the bar members to permit the measurement across shoulders of adjoining piping or similar tubular members with the bar members being offset to accommodate the offset of the shoulders.

The operation of gauge will now be described. In FIGS. 3 and 4 two end to end positioned tubular members or pipes 48 are shown. Each pipe 48 includes an outer surface 50, an inner surface 52 and a beveled end edge 54. End edges 54 of the pipes are located in close proximity, though not touching, and are beveled so as to form in conjunction with one another a groove 55 to accommodate welding of the pipes together. In certain constructions, such as in the construction of a nuclear reactor, the inner surfaces 52 of pipes 48 must be aligned within a close tolerance. Gauge 10 is designed to measure this inner surface pipe alignment. Contacts 26 are of a thin construction and are connected to the body of the bar members 12 and 13 by narrow neck part 56 to enable the contacts to be first inserted edgewise in the spacing between pipe edges 54 and the gauge then turned so that edge face 38 of each contact overlies a pipe inner surface 52 as seen in FIG. 4. Tightening screw 16 is loosened to permit shifting of the bar members to bring contact edge faces 38 into intimate contact with the respective inner surfaces of pipes 48, while shoulder part 14 is slid toward the pipes with its contact surface 32 being brought into engagement with the outer surface 50 of one of the pipes. The engagement of shoulder part 14 with one of the pipes squares the gauge relative to at least one of the pipes and ensures a more accurate determination of the degree of alignment of the two pipes. After contact surface 32 of shoulder part 14 and contact edge faces 38 of the bar members are brought into engagement with pipes 48 as shown in FIG. 4, screw 16 is tightened, locking the bar members and shoulder part together as a unit. The degree of alignment can then be directly read by observing the offset, if any, of scales 44. If desired, reduced neck parts 56 of contacts 26 will permit the gauge to be turned, causing the contacts to be aligned with the opening between beveled end edges 54 of the pipes, to permit the gauge to be removed with the bar members and shoulder part remaining locked together.

Shoulder part 14 preferably has a plurality of tapped holes 36 formed therein. This permits gauge 10 to accommodate pipes or tubular members of various thickness. Thus, depending upon the thickness of pipes 48, tightening screw 16 will be turned into a selected one of the threaded openings 36 in shoulder part 14. Through the utilization of shoulder part 14 and oppositely spaced contact 26 of bar member 13, the thickness of a particular pipe can be measured if desired.

By constructing end parts 18 of the bar members with a predetermined angle of taper where neck parts 56 join the bodies of the bar members, such tapered sections of the end parts can be inserted into the groove 55 formed by beveled end edges 54 of pipes 48 for the purpose of checking and determining the approximate angles of bevel of the pipe end edges. In this manner the user of gauge 10 will have an indication as to whether the groove formed by the cooperating beveled end edges 54 of the pipes will be sufficient to accommodate a proper weld when the pipes are joined.

It is to be understood that the invention is not to be limited to the details above given but may be modified within the scope of the appended claims.

What is claimed is:

1. In a gauge for measuring the degree of alignment of two tubular members positioned end to end in a spaced relationship, each tubular member including a side wall having inner and outer surfaces, said alignment being measured at the inner surfaces of said tubular member side walls, said gauge including parallel first and second bar members having mutually contacting side faces which extend longitudinally of the bar members, said first bar member being shiftable lengthwise relative to said second bar member over the contacting side faces thereof, said bar members having corresponding juxtaposed end parts, each end part being defined by a contact, the contact of said first bar member and the contact of said second bar member projecting oppositely of one another in the same plane, each contact including an edge face disposed at substantially a right angle to said side faces of the bar members, the improvement comprising a shoulder part carried by said first bar member spaced from the end part thereof, means for shifting said shoulder part along said first bar member toward and away from the contact edge face of the first bar member whereby, when said contacts are inserted between said two tubular members at the ends thereof, said first and second bar members can be slid over one another until the end face of one contact engages the side wall inner surface of one tubular member and the edge face of the other contact engages the side wall inner surface of the other tubular member with said shoulder part shifted into contact with the side wall outer surface of one of the tubular members, said degree of alignment being determined by the location of one edge face relative to the other edge face.

2. The gauge of claim 1 and means for securing said first bar member to said second bar member and said shoulder part to said first bar member whereby said gauge can be removed from between said tubular member ends with said end edges remaining fixed in a relative position to indicate said degree of alignment.

3. The gauge of claim 2 wherein each of said first and second members has a longitudinal slotted opening formed in its side face extending through said bar member, said slotted openings overlapping, said bar member securing means including a screw means having a threaded shank extending through said slotted openings and being treated into said shoulder part, said screw means when tightened causing said shoulder part and bar members to be rigidly locked together as a unit, said screw means when loosened permitting said shoulder part and bar members to shift independently of one another.

4. The gauge of claim 1 wherein said shoulder part includes a contact surface extending at a right angle to said first member and located in planar alignment with the contact edge face of said first bar member.

5. The gauge of claim 4 wherein said first and second bar members includes opposite end parts, each of said opposite end parts including a foot part extending at a right angle to the longitudinal dimension of the bar member and paralleling the foot part of the other bar member, said foot parts each having scaled indicia thereon for measuring across the shoulders formed by joined tubular members of varying diameters.

6. The gauge of claim 4 wherein each of said first and second bar members includes scaled indicia means by which the location of one edge face relative to the other edge face of said contacts can be measured.

7. The gauge of claim 1 in which tapered means connect each contact to its bar member, each tapered means being defined by a selected angle, said tubular member ends being beveled to form cooperatively a groove therebetween, said tapered means of said bar members being insertable into said groove for measuring the bevel of said tubular member ends.

* * * * *